United States Patent [19]

Sorice et al.

[11] 3,975,809

[45] Aug. 24, 1976

[54] CUTTING INSERT, ESPECIALLY FOR MILLING OPERATIONS

[75] Inventors: Edward L. Sorice, Crabtree; Dennis G. Jones, Greensburg, both of Pa.

[73] Assignee: Kennametal Inc., Latrobe, Pa.

[22] Filed: June 13, 1975

[21] Appl. No.: 586,643

[52] U.S. Cl. .............................................. 29/95 R
[51] Int. Cl.² ........................................... B26D 1/00
[58] Field of Search .................................. 29/95, 96

[56] References Cited
UNITED STATES PATENTS

| | | | |
|---|---|---|---|
| 3,137,918 | 6/1964 | Bruening | 29/96 |
| 3,187,406 | 6/1965 | Franko | 29/95 |
| 3,497,933 | 3/1970 | Okada | 29/95 |
| 3,504,413 | 4/1970 | Siewert et al. | 29/95 |
| 3,781,956 | 1/1974 | Jones et al. | 29/95 R |
| 3,786,541 | 1/1974 | Lundgren | 29/95 |
| 3,815,191 | 6/1974 | Holma | 29/95 |

FOREIGN PATENTS OR APPLICATIONS
46-32309   11/1971   Japan

*Primary Examiner*—Harrison L. Hinson
*Attorney, Agent, or Firm*—Melvin A. Crosby; Lawrence R. Burns

[57] ABSTRACT

A cutting insert, especially for milling operations, in which at least one face of the insert has recesses extending from respective corners thereof along respective edges of the inserts. The recesses widen in a direction away from the respective corners and are generally "V" shaped in cross section. The walls forming the bottom of the insert are in the form of skewed planes and make increasing included angles with the respective face of the insert in a direction away from the respective corner of the insert. The recesses at the wider ends have a concave wall portion extending upwardly to the respective face of the insert.

10 Claims, 9 Drawing Figures

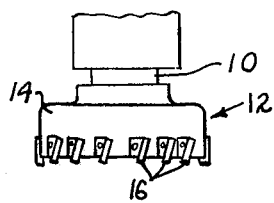
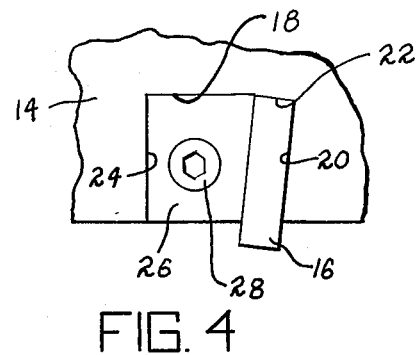
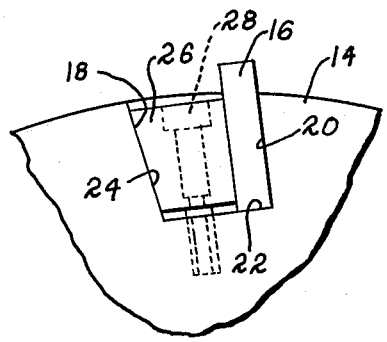
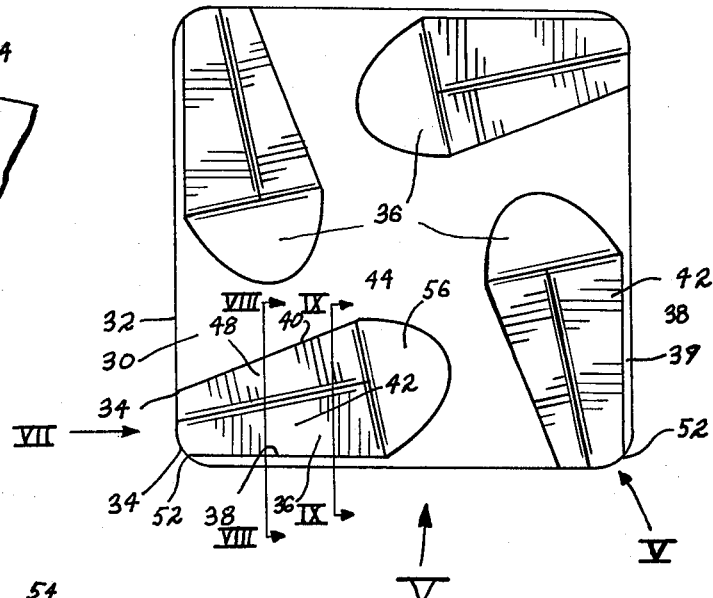
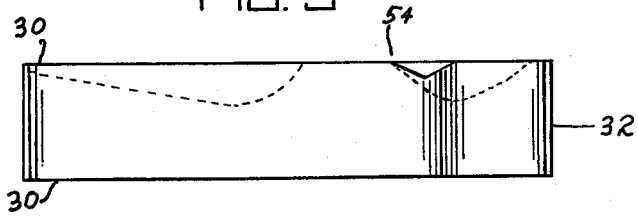
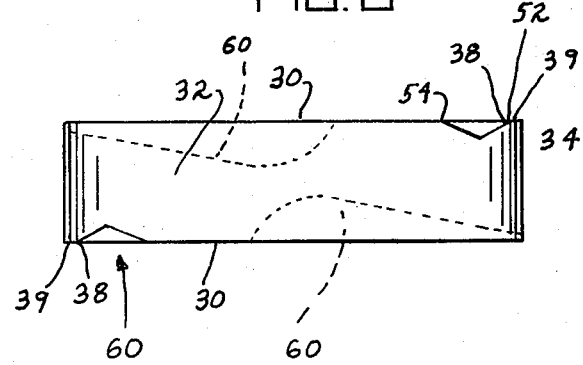

CUTTING INSERT, ESPECIALLY FOR MILLING OPERATIONS

This invention relates to cutting inserts and is particularly concerned with a cutting insert especially adapted for use in milling and boring tools.

Milling and boring tools of the nature with which the present invention is concerned comprise holders which are mounted on a spindle and rotate on the spindle axis. The holders comprise a plurality of slots or notches and hard cutting inserts are detachably mounted in the slots or notches and project outwardly from the body of the tool so as to engage the work to be cut thereby.

Normally, cutting inserts present some combination of negative and/or positive rakes when mounted in a cutter. The rakes are disposed angularly to a radial and axial plane of reference. In the four combinations of rakes, axial and radial, only the combination of negative radial and negative axial rake permit the cutting insert to be used on both sides. The other three combinations, because of the required geometry of the cutting insert, namely, clearance will not permit the insert to be usable on both sides.

Since various combinations of angles are preferred for various materials to be machined, and because the use of both sides of the insert doubles the number of usable cutting edges, recesses in the cutting insert may be provided which will provide any of the aforementioned four combinations when the cutting insert is mounted in a negative axial and radial rake position. The recess is parallel to the respective edge and widens in a direction away from the respective corner of the insert.

Normally, cutting inserts present a negative rake angle to the work unless the cutting insert has a special shape which is usually ground on the insert. The negative rake angle is necessary to obtain side and bottom clearance between the cutting insert and the work and to permit use of both sides of the insert. The side clearance is provided for at the radially outer side of the milling cutter by inclining the cutting inserts somewhat backwardly from a radius while at the bottom of the cutting insert, the clearance is provided by inclining the insert forwardly from a vertical position.

BRIEF SUMMARY OF THE INVENTION

According to the present invention, a cutting insert is provided in which the benefits of various rake angles, including positive rake angles, can be obtained in a conventional holder in which the cutting inserts are supported at negative rake angles and providing at least one face of the insert with recesses having surfaces so inclined that a neutral, positive or lesser negative or radial and axial combinations thereof cutting angles are obtained at the cutting edge of the insert.

The recesses may be sharp edged or may provide a small land area at the cutting edge of the insert of, say 0.010 inches wide which prevents easy chipping or rapid wear of the insert at the cutting edge.

The recesses formed in the face of the insert commence at the corners thereof and taper outwardly in width and increase in depth in a direction away from the respective corners and terminate in the region of the center of each side of the inserts so that the cutting inserts retain a substantial amount of solid material and thus have considerable mechanical strength. Further, the angle of inclination of the walls of the recess vary in the direction of the length of the recess.

If the recesses in the inserts extend relatively deeply into the respective inserts, they may be formed in only one side thereof but if the recesses are fairly shallow, they can be formed into both sides of the insert and thus double the number of cutting edges available.

The exact nature of the present invention will become more clearly apparent upon reference to the following specification taken in connection with the accompanying drawings in which:

FIG. 1 shows a side elevation of a typical milling cutter.

FIG. 2 is a fragmentary view looking in at one of the cutting inserts of the milling cutter, drawn at increased scale, and showing the manner in which the insert is clamped in the body of the milling cutter.

FIG. 3 is a view looking up from the bottom of FIG. 2.

FIG. 4 is an enlarged plan view of a typical cutting insert showing the recesses formed therein.

FIG. 5 is a view looking in at the insert of FIG. 4 in the direction of the arrow V on FIG. 4, but showing recesses in only one face of the insert.

FIG. 6 is a view looking in at one edge of the insert of FIG. 4.

DETAILED DESCRIPTION OF THE INVENTION

Figure 7:
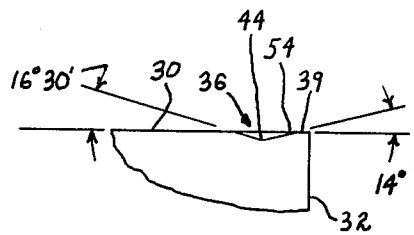
FIGS. 7 to 9 are fragmentary sections indicated by lines VII—VII, VIII—VIII and IX—IX on FIG. 4.

Referring to the drawings somewhat more in detail, 10 shows a machine tool spindle and 12 represents a cutting tool carried by the spindle and consisting of a body 14 and a plurality of cutting inserts 16 supported therein.

FIGS. 2 and 3 will show that body 14 has a plurality of notches 18 formed therein and the inserts 16 are accurately located therein as by being disposed in the notches against one side face 20 thereof and in an engagement with the bottom wall 22 thereof. The wall 24 opposite wall 20 converges with wall 20 toward the center of body 14 and a wedge shaped clamp member 26 is disposed in each notch between the exposed side of insert 16 and wall 24. Each wedge is pulled in tight by clamp screw 28 thereby fixedly to clamp the respective insert 16 against the pertaining walls 20 and 22.

As will be seen in FIGS. 4, 5 and 6, each insert comprises a body of hard wear resistant material such as a cemented hard metallic carbide, tungsten or titanium, or mixtures thereof, for example, and has parallel upper and lower faces 30 and a peripheral wall 32 perpendicular to the upper and lower faces. The corners of the insert are slightly rounded or flatted as at 34 and formed into one or both faces of the insert are recesses 36. Each recess 36 has an edge 38 extending parallel to and adjacent one side edge of the insert and extending for a little over half the length of the respective side of the insert. The planar region between each edge 38 and the adjacent side edge of the insert forms a land area 39. Each recess has another side edge 40 diverging from side edge 38 in a direction away from the adjacent corner of the insert.

Extending from edge 38 downwardly at an incline is a surface 42 which may be in the form of a skewed, or twisted, plane. The surface inclines downwardly away from edge 38, and at an ever increasing angle as will be seen in FIGS. 7, 8 and 9. The area 42 thus widens in a direction away from the respective side edge of the insert.

Figure 8:
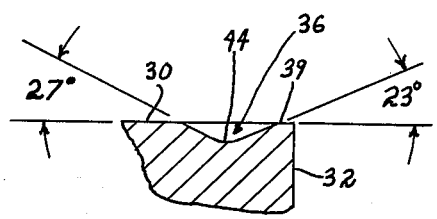
Figure 9:
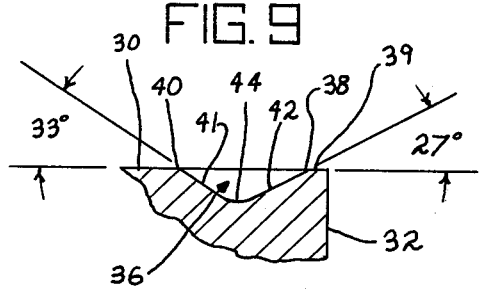

Inclining downwardly from edge 40 is another surface 41 which is also in the form of a skewed, or twisted, plane and which inclines at a slightly greater angle to the plane of the respective face of the insert as will also be seen in FIGS. 7, 8 and 9. A rounded region 43 joins the lower edges of surfaces 42 and 41 and a concave region 45 is located at the inside end of the recess.

Each edge 38 of the insert terminates at 52 within the region of the pertaining corner of the insert and edge 40 terminates at 54 immediately adjacent the said corner. The recess thus has an end region 56 which interrupts the peripheral wall 32 of the insert as will be seen in FIGS. 5 and 6.

As will be seen in FIG. 4, four of the said recesses are formed in the upper face of the insert, each extending from a different one of the four corners of the insert illustrated along a respective side edge of the recesses, and in the same peripheral direction of the insert. FIG. 6 shows how recesses 60, which are the same shape as recesses 32, could be formed in the opposite face of the insert and so arranged that, when the insert is inverted, the recesses in the face formerly on the bottom will be in the same position as the recesses of the face formerly on the top. The recesses will, then, always occupy the proper position on the working side of the insert.

Inserts formed in the manner illustrated have substantial body thickness and thus do not break easily and can take heavy cuts. The recesses provided in the insert permit substantially positive rake cutting conditions and directional flow of chips, which is of particular merit in respect of some materials, especially the softer materials, because it permits more rapid cutting with less heating up of the work and of the inserts and less tearing of the workpiece surface. Furthermore, the positive rake conditions induce chip flow and inhibit buildup on the cutting edge of the insert.

The variation in the angle of inclination of surfaces 41 and 42 toward the wider end of the respective recess provide for variation in the rake and chip control as the depth of cut taken by the insert varies.

Inserts according to the present invention are made to precise sizes and when placed in the notches provided therefor in a cutter body and clamped in place therein are accurately positioned radially and axially of the cutter body.

Modifications may be made within the scope of the appended claims.

What is claimed is:

1. A cutting insert comprising a body of hard wear resistant material having parallel top and bottom faces and a peripheral wall perpendicular to said top and bottom faces, said body being polygonal when viewed in a direction perpendicular to said faces, whereby said peripheral wall is in the form of flat side walls which meet at the corners of the insert and which intersect the top and bottom faces of the insert to form edges on the insert, said corners of the insert being rounded, at least one recess in one of said top and bottom faces extending from a point near a respective corner of the insert along a respective edge of the insert, said recess widening in a direction away from said respective corner and having a first bottom wall inclining downwardly away from the respective edge of the insert and second bottom wall portion extending upwardly from the lower edge of said first bottom wall portion to said plane, both of said first and second bottom wall portions forming skewed planes each making an ever increasing included angle with the plane of the respective face in a direction away from the respective corner of the insert, and said recess comprising an end wall portion on the end thereof remote from said respective corner and extending from the adjacent ends of said first and second bottom wall portions upwardly to said plane.

2. A cutting insert according to claim 1 in which said recess adjacent said respective corner intersects the edge of the insert which meets said respective edge of the insert at said corner.

3. A cutting insert according to claim 2 in which the said first bottom wall portion intersects said one face along a line parallel and adjacent to said respective edge to define a land area along said respective edge.

4. A cutting insert according to claim 3 in which said end wall portion is concave toward said recess.

5. A cutting insert according to claim 1 in which said insert is square when viewed perpendicular to said top and bottom faces and there is a said recess extending from each corner of the insert along a respective edge of the insert in at least one of said top and bottom faces of the insert.

6. A cutting insert according to claim 1 in which each said recess extends from its respective corner of the insert in the same peripheral direction of the insert.

7. A cutting insert according to claim 5 in which each of said top and bottom faces have the said recesses formed therein.

8. A cutting insert according to claim 7 in which the recesses in each said face of the insert extend from the respective corners of the insert in the same peripheral direction when the insert is viewed toward the respective face.

9. A cutting insert according to claim 1 in which said insert is formed of a cemented metal carbide material.

10. A cutting insert according to claim 2 in which said recess deepens in a direction away from said respective corner.

* * * * *